(12) United States Patent
Joung et al.

(10) Patent No.: US 9,603,130 B2
(45) Date of Patent: Mar. 21, 2017

(54) APPARATUS FOR MEASURING EVM OF PHICH IN LTE SYSTEM

(71) Applicant: INNOWIRELESS CO., LTD., Gyeonggi-do (KR)

(72) Inventors: Jin Soup Joung, Gyeonggi-do (KR); Sung Chan Choi, Gyeonggi-do (KR); Yong Hoon Lim, Seoul (KR); Byung Kwan Jang, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 92 days.

(21) Appl. No.: 14/610,188

(22) Filed: Jan. 30, 2015

(65) Prior Publication Data

US 2016/0183114 A1    Jun. 23, 2016

(30) Foreign Application Priority Data

Dec. 22, 2014  (KR) .......................... 10-2014-0186338

(51) Int. Cl.
| | | |
|---|---|---|
| H04J 1/16 | (2006.01) |
| H04W 72/04 | (2009.01) |
| H04L 1/18 | (2006.01) |
| H04L 1/20 | (2006.01) |

(52) U.S. Cl.
CPC ....... *H04W 72/0413* (2013.01); *H04L 1/1812* (2013.01); *H04L 1/203* (2013.01)

(58) Field of Classification Search
CPC ... H04W 72/0413; H04L 1/203; H04L 1/1812
See application file for complete search history.

(56) References Cited

U.S. PATENT DOCUMENTS

| | | | |
|---|---|---|---|
| 2015/0029882 A1* | 1/2015 | Yang ............... | H04J 11/0056 370/252 |
| 2015/0304075 A1* | 10/2015 | Ahmed ............. | H04L 1/203 375/228 |

FOREIGN PATENT DOCUMENTS

| | | |
|---|---|---|
| KR | 1020100006111 A | 1/2010 |
| KR | 1020100021156 A | 2/2010 |
| KR | 1020120085887 A | 1/2012 |

* cited by examiner

*Primary Examiner* — Phuc Tran
(74) *Attorney, Agent, or Firm* — Kaplan Breyer Schwarz & Ottesen, LLP

(57) ABSTRACT

An apparatus for efficiently and simply measuring an error vector magnitude (EVM) of a physical hybrid automatic repeat request (ARQ) indicator channel (PHICH) in a long term evolution (LTE) system. The apparatus includes an overall PHICH group data extraction unit configured to extract all PHICH group data from a received signal in a first subframe, an overall PHICH group analysis unit configured to detect orthogonal sequences and acknowledgement/negative acknowledgement (ACK/NACK) bits used in respective PHICH groups by analyzing all resources of the extracted PHICH group data, an ideal PHICH group sequence generation unit configured to generate an ideal PHICH group sequence using the detected ACK/NACK bits and orthogonal sequences, and an EVM measurement unit configured to measure an EVM of a PHICH using the ideal PHICH group sequence and the received signal.

4 Claims, 5 Drawing Sheets

APPARATUS FOR MEASURING EVM OF PHICH IN LTE SYSTEM

CROSS-REFERENCE TO RELATED APPLICATION

This application claims priority to and the benefit of Korean Patent Application No. 10-2014-0186338, filed on Dec. 22, 2014, the disclosure of which is incorporated herein by reference in its entirety.

FIELD OF THE INVENTION

The present invention relates to an apparatus for measuring an error vector magnitude (EVM) of a physical hybrid automatic repeat request (ARQ) indicator channel (PHICH) in a long term evolution (LTE) system, and more particularly, to an apparatus for efficiently and simply measuring an EVM of a PHICH in an LTE system.

BACKGROUND OF THE INVENTION

As is well known, an EVM is an indicator frequently used to measure the quality of a digital-converted signal. As another indicator for measuring the quality of a digital-converted signal, there is a bit error rate (BER). However, an EVM includes information on the phase of a signal as well as the magnitude, and thus is used to measure signal quality more usefully than BER.

Since an EVM is defined as an error between an ideal transmitted signal transmitted by a transmitting end and a signal received by a receiving end, it is necessary to know the ideal transmitted signal in advance so as to measure an EVM. Meanwhile, binary phase shift keying (BPSK), quadrature phase shift keying (QPSK), 16-symbol quadrature amplitude modulation (16 QAM), and 64 QAM are used as modulation schemes in downlink channels of LTE systems. In the case of these modulation schemes, it is possible to easily detect an ideal transmitted signal through a received LTE message or blind detection, and thus an EVM can be readily measured.

According to the LTE standard of the third generation partnership project (3GPP) technical specification (TS) 36.141, an EVM is defined as shown in Equation 1 below.

$$EVM = \sqrt{\frac{\sum_{t \in T}\sum_{f \in F(t)} |Z_{eq}(f, t) - I(f, t)|^2}{\sum_{t \in T}\sum_{f \in F(t)} |I(f, t)|^2}} \quad \text{[Equation 1]}$$

In Equation 1 above, T denotes a symbol set in a subframe, F(t) denotes a subcarrier set in a symbol t, I(f, t) denotes an ideal transmitted signal at a subcarrier f of the symbol t generated by EVM measurement equipment, and $Z_{eq}(f, t)$ denotes a signal received by the EVM measurement equipment.

As can be seen from Equation 1 above, it is necessary to know an ideal signal at the corresponding subcarrier in advance so as to measure an EVM in an LTE system. Among LTE downlink channels, a primary synchronization signal (PSS), a secondary synchronization signal (SSS), a physical broadcast channel (PBCH), a physical control format indicator channel (PCFICH), a physical downlink control channel (PDCCH), and a physical downlink shared channel (PDSCH) have previously determined modulation schemes, and thus it is possible to easily generate ideal signals through blind detection and so on.

However, in the case of a PHICH in an LTE system, several users use the same orthogonal frequency division multiplexing (OFDM) resources due to the PHICH standard. Therefore, the constellation diagram of a received signal does not have a general digital-modulation shape, and it is difficult to determine an ideal transmitted signal. For this reason, it is difficult to measure the EVM of a PHICH.

FIG. 1 is a sequence diagram of a process for generating a PHICH signal in an LTE system. As shown in FIG. 1, encoded PHICH bits are transmitted through a PHICH, and several PHICHs can be transmitted through a resource element (RE) set constituting one PHICH. Here, such a RE set is referred to as one PHICH group. In this way, several PHICHs can be transmitted through the same PHICH group, and thus a method for distinguishing each PHICH from other PHICHs in the same group is necessary. The distinction is made through different orthogonal sequences.

Therefore, resources of a PHICH have a pair of a PHICH group number $n_{PHICH}^{group}$ and an orthogonal sequence index $n_{PHICH}^{seq}$ in a group.

Referring back to FIG. 1, an encoded PHICH bit b(i) is repeated three times (3× repetition) to be three bits for error reduction, BPSK-modulated (BPSK Modulation), as shown in Table 1 below, multiplied by an orthogonal sequence (Orthogonal Code n), and then scrambled (Scrambling). Next, the scrambled PHICH symbol data is processed through layer mapping (Layer mapping) and precoding (Precoding). All pieces of PHICH data precoded in this way are summed and transmitted through one PHICH group.

TABLE 1

| b(i) | I | Q |
|---|---|---|
| 0 | $1/\sqrt{2}$ | $1/\sqrt{2}$ |
| 1 | $-1/\sqrt{2}$ | $-1/\sqrt{2}$ |

Meanwhile, a maximum of eight PHICHs can be transmitted through one PHICH group, and respective PHICHs are distinguished from each other by orthogonal sequences. Here, pieces of data of the PHICHs and the phases of the orthogonal sequences may differ from one another. Therefore, the sum of the PHICHs serves to change the phase and the size of an original modulation symbol, and the PHICH group has an uncommon constellation diagram instead of a BPSK constellation diagram.

As described above, in the case of a PHICH, it is difficult to determine an ideal transmitted signal, and thus it is difficult to measure the EVM of the PHICH.

This work was supported by the ICT R&D program of MSIP/IITP, Republic of Korea. [14-911-01-003, Development of software-based measuring equipment for enhancing inspection of radio station]

RELATED DOCUMENTS

1. Korean Patent Publication No. 10-2012-0085887 (CHANNEL STATUS REPORTING)
2. Korean Patent Publication No. 10-2010-0021156 (Apparatus for measuring signal quality)
3. Korean Patent Publication No. 10-2010-0006111 (Mobile communication system of signal analysis method)

SUMMARY OF THE INVENTION

The present invention is directed to an apparatus for efficiently and simply measuring an error vector magnitude (EVM) of a physical hybrid automatic repeat request (ARQ) indicator channel (PHICH) in a long term evolution (LTE) system.

According to an aspect of the present invention, there is provided an apparatus for measuring an EVM of a PHICH in an LTE system, the apparatus including: an overall PHICH group data extraction unit configured to extract all PHICH group data from a received signal in a first subframe; an overall PHICH group analysis unit configured to detect orthogonal sequences and acknowledgement/negative acknowledgement (ACK/NACK) bits used in respective PHICH groups by analyzing all resources of the extracted PHICH group data; an ideal PHICH group sequence generation unit configured to generate an ideal PHICH group sequence using the detected ACK/NACK bits and orthogonal sequences; and an EVM measurement unit configured to measure an EVM of a PHICH using the ideal PHICH group sequence and the received signal.

In the above-described configuration, the overall PHICH group analysis unit may de-precode, de-layer-map, and descramble the extracted PHICH group data, de-spread the descrambled PHICH group data using a plurality of orthogonal codes according to each group, detect the orthogonal sequences currently in use through correlation values between the de-spread data and the respective orthogonal sequences, and determine the ACK/NACK bits for the detected orthogonal sequences.

The ideal PHICH group sequence generation unit may generate a plurality of bits by repeating an ACK/NACK bit of each PHICH group a plurality of times, binary phase shift keying (BPSK) modulate the generated bits, multiply the BPSK-modulated bits by an orthogonal sequence currently in use, scramble the BPSK-modulated bits, layer map and precode the scrambled PHICH symbol data, and generate the one ideal PHICH group sequence by summing all the precoded PHICH data.

The apparatus may further include a channel equalization unit configured to remove noise included in the received signal, and the EVM measurement unit may measure the PHICH EVM by inserting the received signal processed through the channel equalization unit and the ideal PHICH group sequence into $$EVM = \sqrt{\frac{\sum_{t \in T} \sum_{f \in F(t)} |Z_{eq}(f, t) - I(f, t)|^2}{\sum_{t \in T} \sum_{f \in F(t)} |I(f, t)|^2}}$$

where T denotes a symbol set in a subframe, F(t) denotes a subcarrier set in a symbol t, I(f, t) denotes an ideal transmitted signal at a subcarrier f of the generated symbol t, and $Z_{eq}(f, t)$ denotes the received signal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

An apparatus for measuring an error vector magnitude (EVM) of a physical hybrid automatic repeat request (ARQ) indicator channel (PHICH) in a long term evolution (LTE) system according to an exemplary embodiment of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
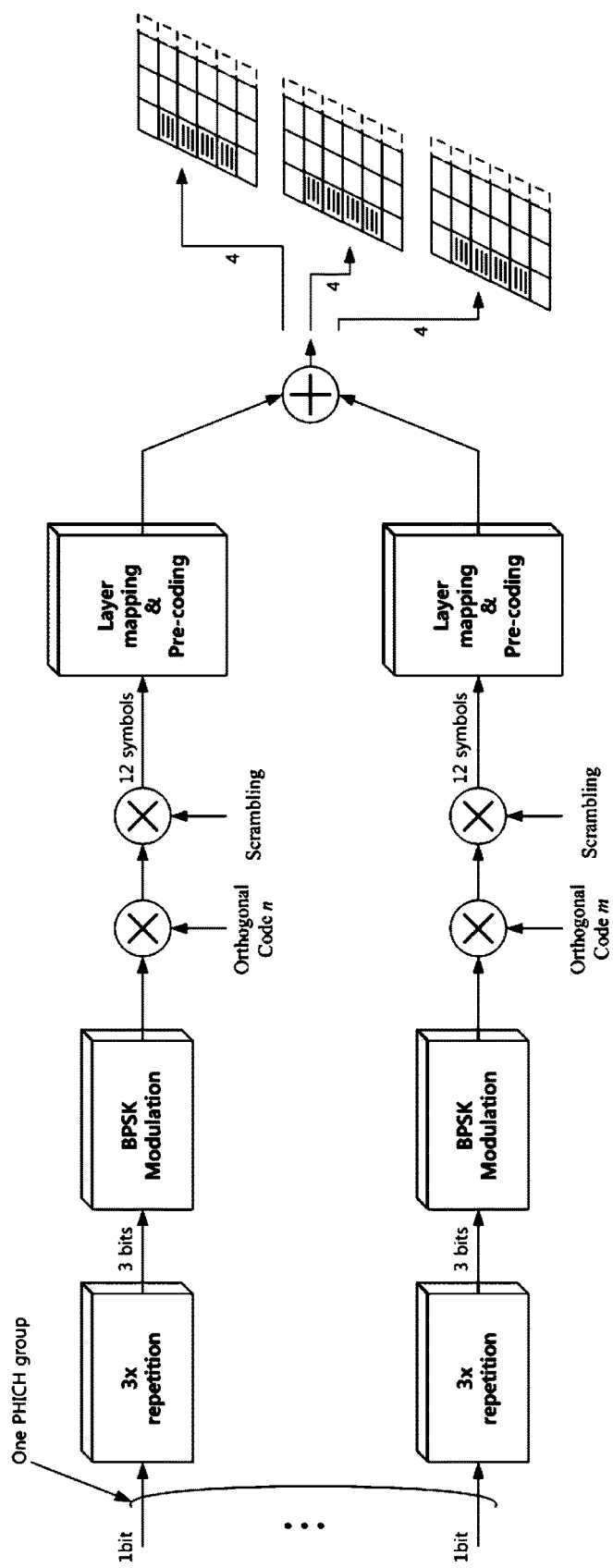
FIG. 1 is a sequence diagram of a process for generating a physical hybrid automatic repeat request (ARQ) indicator channel (PHICH) signal in a long term evolution (LTE) system.
Figure 2:
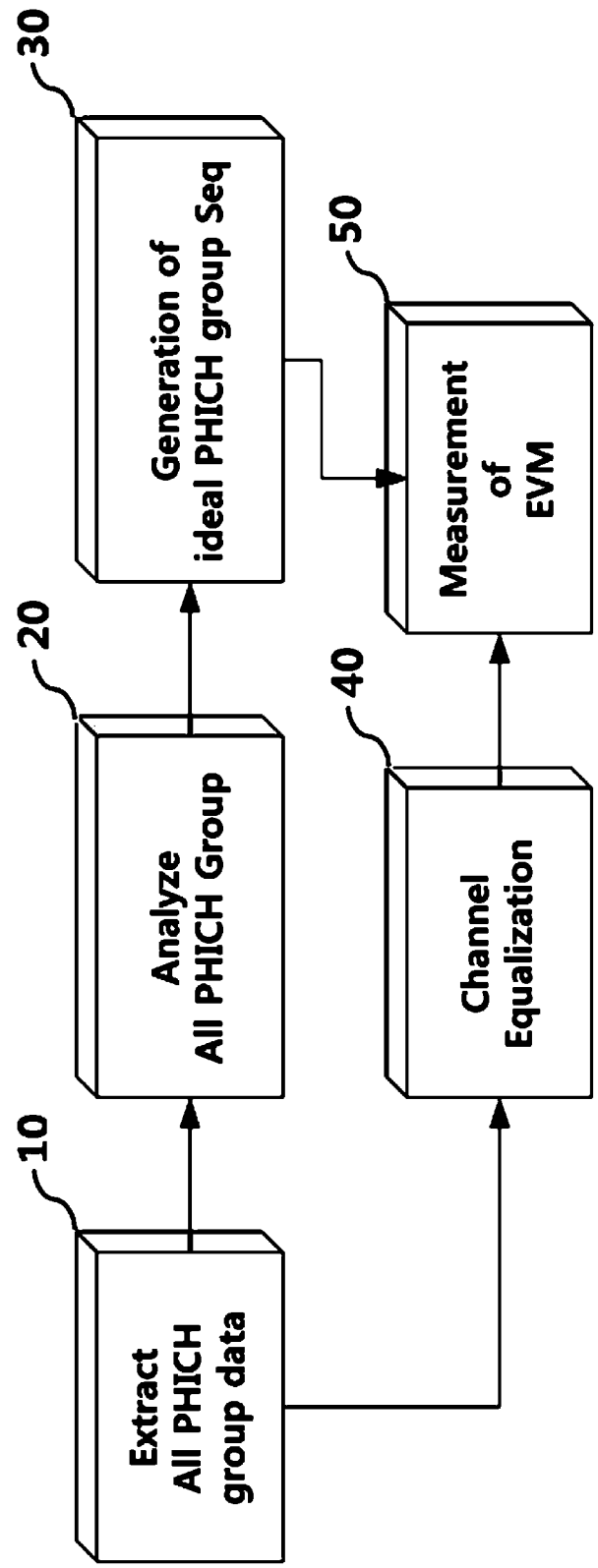
FIG. 2 is a functional block diagram of an apparatus for measuring an error vector magnitude (EVM) of a PHICH in an LTE system.

FIG. 2 is a functional block diagram of an apparatus for measuring an EVM of a PHICH in an LTE system. It is assumed that a time/frequency synchronization process, a fast Fourier transform (FFT) process, etc. have been performed in advance. As shown in FIG. 2, an apparatus for measuring an EVM of a PHICH in an LTE system according to an exemplary embodiment of the present invention includes an overall PHICH group data extraction unit (Extract All PHICH group data) 10 which extracts all PHICH group data from a received signal in a first subframe, an overall PHICH group analysis unit (Analyze All PHICH Group) 20 which detects orthogonal sequences and acknowledgement/negative acknowledgement (ACK/NACK) bits used in respective PHICH groups by analyzing all resources of the extracted PHICH group data, a channel equalization unit (Channel Equalization) 40 which removes or reduces intersymbol interference (ISI) from the extracted PHICH group data, an ideal PHICH group sequence generation unit (Generation of ideal PHICH group Sequence) 30 which generates an ideal PHICH group sequence using the ACK/NACK bits and the orthogonal sequences detected by the overall PHICH group analysis unit 20, and an EVM measurement unit (Measurement of EVM) 50 which measures an EVM of a PHICH by inserting the ideal PHICH group sequence and the received signal into Equation 1.

Figure 3:
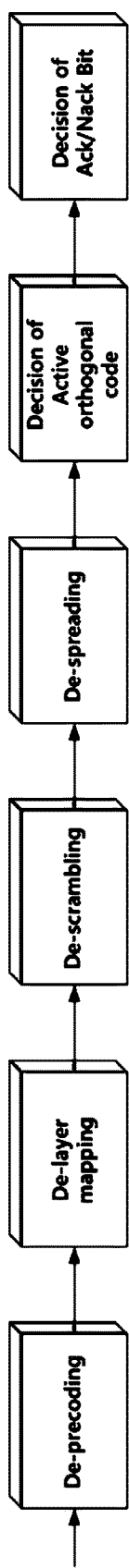
FIG. 3 is a detailed functional block diagram of an overall PHICH group analysis unit of FIG. 2.

FIG. 3 is a detailed functional block diagram of an overall PHICH group analysis unit of FIG. 2. As shown in FIG. 3, the overall PHICH group analysis unit 20 according to the exemplary embodiment of the present invention de-precodes (De-precoding), de-layer-maps (De-layer mapping), and descrambles (Descrambling) the extracted PHICH group data, and de-spreads (De-spreading) the descrambled PHICH group data using a plurality of, that is, eight, orthogonal codes defined in a standard according to each group. Next, the overall PHICH group analysis unit 20 detects the orthogonal sequences currently in use through correlation values between the de-spread data and the respective orthogonal sequences (Decision of Active orthogonal code), and determines the ACK/NACK bits for the detected orthogonal sequences (Decision of Ack/Nack bit).

Figure 4:
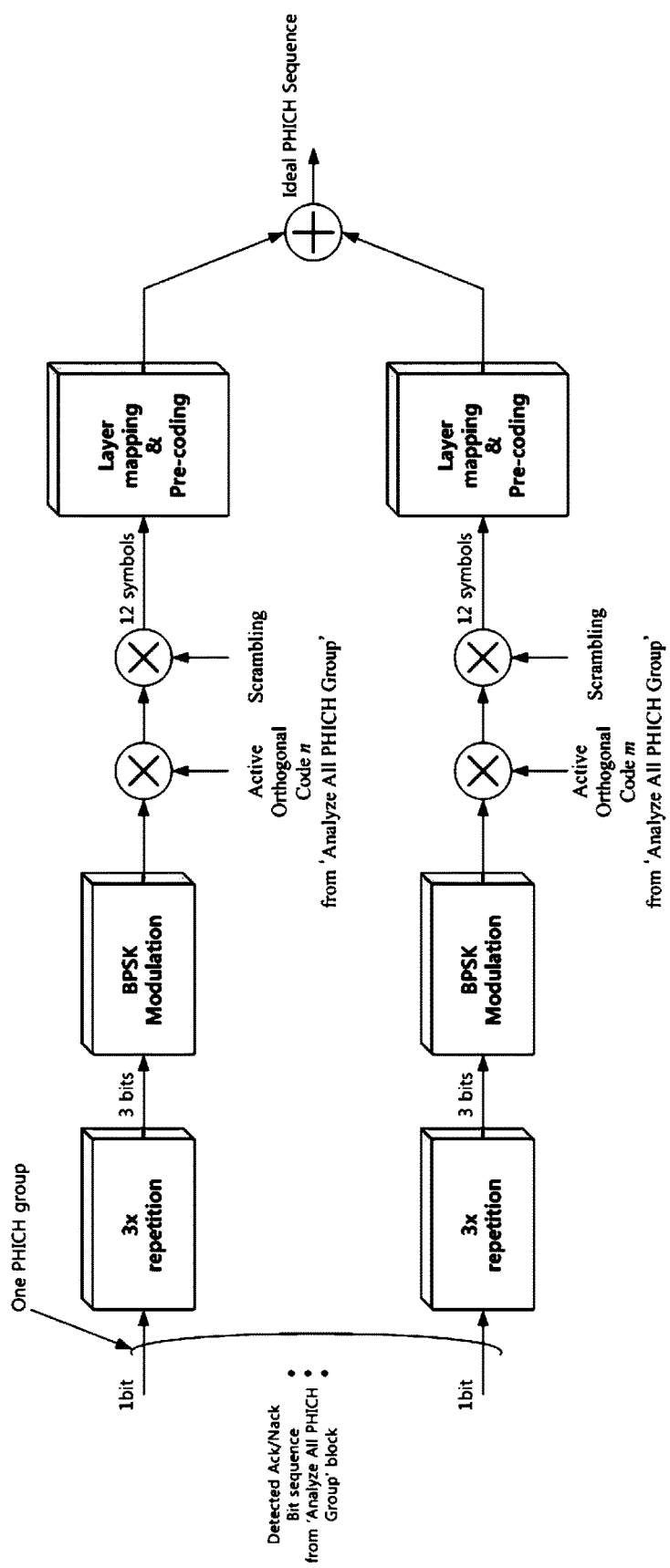
FIG. 4 is a detailed functional block diagram of an ideal PHICH group sequence generation unit of FIG. 2.

FIG. 4 is a detailed functional block diagram of an ideal PHICH group sequence generation unit of FIG. 2. As shown in FIG. 4, the ideal PHICH group generation unit 30 according to the exemplary embodiment of the present invention repeats an ACK/NACK bit of each PHICH group three times (3× repetition) to make three bits for error reduction, and then BPSK modulates the three bits (BPSK Modulation) as shown in Table 1. Subsequently, the ideal PHICH group generation unit 30 multiplies the BPSK-modulated bits by an orthogonal sequence (Active Orthogonal Code n) currently in use and detected by the overall PHICH group analysis unit 20, and scrambles the product.

Next, the ideal PHICH group generation unit 30 layer-maps (Layer mapping) and precodes (Pre-coding) the scrambled PHICH symbol data, and generates one ideal PHICH group sequence by summing all the PHICH data precoded in this way.

Finally, the EVM measurement unit 50 measures an EVM of a PHICH by inserting the ideal PHICH group sequence generated by the ideal orthogonal sequence generation unit 30 and the received signal from which noise, such as ISI, is removed through the channel equalization unit 40 into Equation 1.

A method of measuring an EVM of a PHICH in an LTE system according to an exemplary embodiment of the present invention will be described in detail below.

Figure 5:
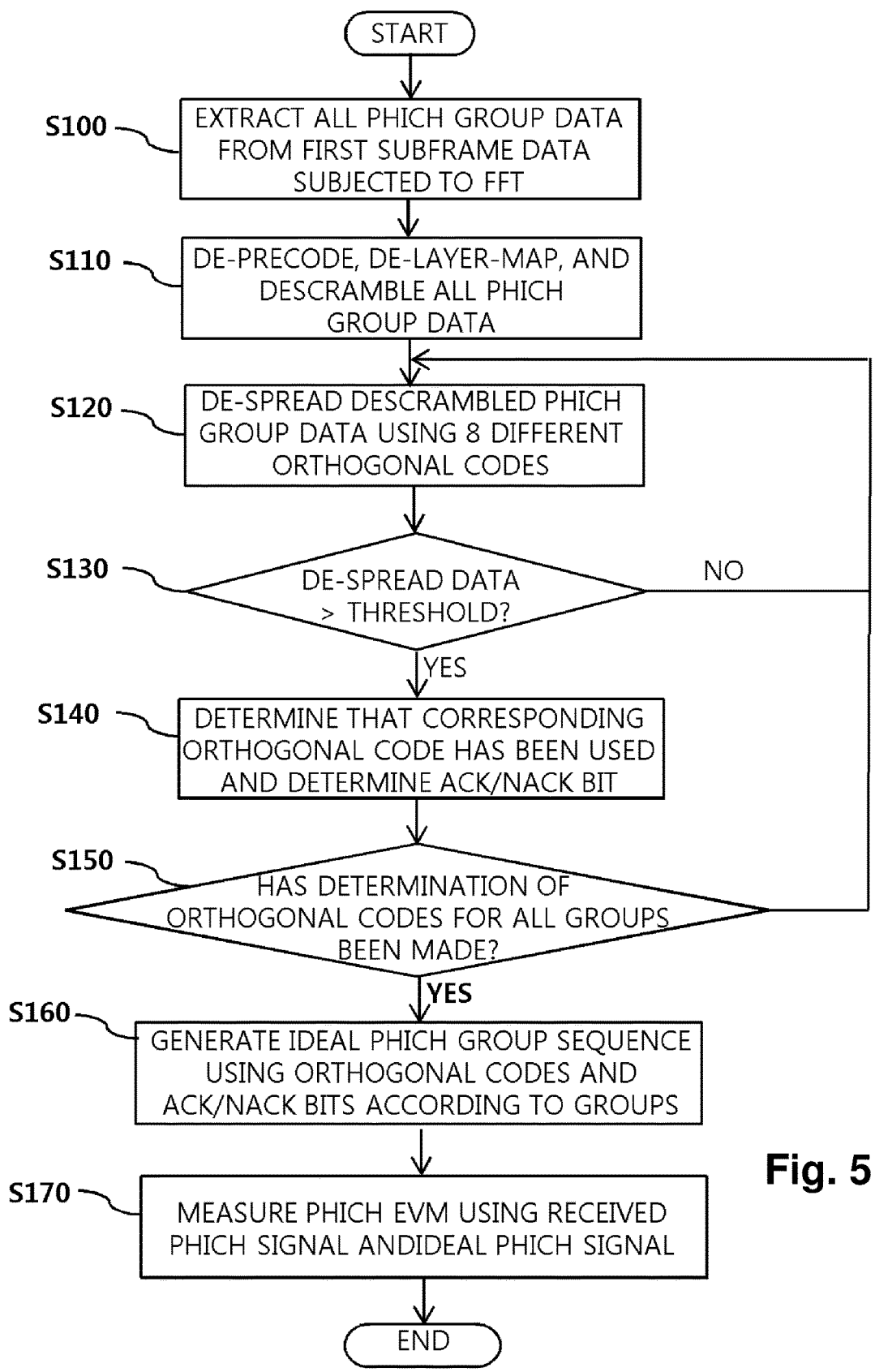
FIG. 5 is a flowchart illustrating a method of measuring an EVM of a PHICH in an LTE system according to an exemplary embodiment of the present invention.

FIG. 5 is a flowchart illustrating a method of measuring an EVM of a PHICH in an LTE system according to an exemplary embodiment of the present invention. It is assumed that a time/frequency synchronization process, an FFT process, etc. have been performed in advance. Under these circumstances, all PHICH group data is extracted from frequency domain data of a first subframe having been subjected to an FFT in operation S100.

Next, using the all PHICH group data extracted in this way, all PHICH groups are analyzed. Specifically, in this analysis procedure, de-precoding, de-layer-mapping, and descrambling are sequentially performed on all the extracted PHICH group data (operation S110), and the PHICH group data descrambled in this way is de-spread using a plurality of, that is, eight, orthogonal codes defined in a standard according to each group (operation S120).

Next, in operation S130, it is determined whether pieces of data de-spread using the respective orthogonal codes exceed a particular threshold according to each group. When a piece of data exceeds the particular threshold, it is determined that the corresponding orthogonal code has been used, and an ACK/NACK bit of the corresponding group is determined (operation S140). On the other hand, when the piece of data is less than the particular threshold, it is determined that the corresponding orthogonal code has not been used, and the process returns to operation S120, so that de-spreading is performed using another orthogonal code.

Next, in operation S150, it is determined whether analysis of all the PHICH groups, that is, determination of orthogonal codes for all the PHICH groups, has been completed. When the analysis has not been completed, the process returns to operation S120. On the other hand, when the analysis has been completed, operation S160 is performed, so that an ideal PHICH group sequence is generated using orthogonal codes currently in use and ACK/NACK bits according to the PHICH groups.

Here, the ideal PHICH group sequence may be generated through a procedure of repeating an ACK/NACK bit of each PHICH group three times to make three bits for error reduction, BPSK modulating the three bits as shown in Table 1 above, multiplying the BPSK-modulated bits by an orthogonal sequence currently in use, scrambling the product, layer-mapping and precoding the scrambled PHICH symbol data, and summing all the precoded PHICH data.

Finally, in operation S170, a PHICH EVM is measured by inserting a received signal from which noise, such as ISI, is removed through channel equalization and an ideal PHICH signal into Equation 1 above.

As described above, using an apparatus for measuring an EVM of a PHICH in an LTE system according to an exemplary embodiment of the present invention, it is possible to efficiently and simply measure an EVM of a PHICH in an LTE system.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for measuring an error vector magnitude (EVM) of a physical hybrid automatic repeat request (ARQ) indicator channel (PHICH) in a long term evolution (LTE) system, the apparatus comprising:
   an overall PHICH group data extraction unit, wherein the overall PHICH group data extraction unit extracts all PHICH group data from a received signal in a first subframe;
   an overall PHICH group analysis unit, wherein the overall PHICH group analysis unit detects orthogonal sequences and acknowledgement/negative acknowledgement (ACK/NACK) bits used in respective PHICH groups by analyzing all resources of the extracted PHICH group data;
   an ideal PHICH group sequence generation unit, wherein the ideal PHICH group sequence generation unit generates an ideal PHICH group sequence using the detected ACK/NACK bits and orthogonal sequences; and
   an EVM measurement unit, wherein the EVM measurement unit measures an EVM of a PHICH using the ideal PHICH group sequence and the received signal.

2. The apparatus of claim 1, wherein the overall PHICH group analysis unit de-precodes, de-layer-maps, and descrambles the extracted PHICH group data, de-spreads the descrambled PHICH group data using a plurality of orthogonal codes according to each group, detects the orthogonal sequences currently in use through correlation values between the de-spread data and the respective orthogonal sequences, and determines the ACK/NACK bits for the detected orthogonal sequences.

3. The apparatus of claim 1, wherein the ideal PHICH group sequence generation unit generates a plurality of bits by repeating an ACK/NACK bit of each PHICH group a plurality of times, binary phase shift keying (BPSK) modulates the generated bits, multiplies the BPSK-modulated bits by an orthogonal sequence currently in use, scrambles the BPSK-modulated bits, layer-maps and precodes the scrambled PHICH symbol data, and generates the one ideal PHICH group sequence by summing all the precoded PHICH data.

4. The apparatus of claim 1, further comprising a channel equalization unit, wherein the channel equalization unit removes noise included in the received signal, and wherein the EVM measurement unit measures the PHICH EVM by inserting the received signal processed through the channel equalization unit and the ideal PHICH group sequence into $$EVM = \sqrt{\frac{\sum_{t \in T}\sum_{f \in F(t)} |Z_{eq}(f, t) - I(f, t)|^2}{\sum_{t \in T}\sum_{f \in F(t)} |I(f, t)|^2}}$$

where T denotes a symbol set in a subframe, F(t) denotes a subcarrier set in a symbol t, I(f, t) denotes an ideal transmitted signal at a subcarrier f of the generated symbol t, and $Z_{eq}(f, t)$ denotes the received signal.

\* \* \* \* \*